United States Patent

Amamori

(10) Patent No.: US 6,692,021 B2
(45) Date of Patent: Feb. 17, 2004

(54) AIRBAG APPARATUS

(75) Inventor: Ichiro Amamori, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/064,528

(22) Filed: Jul. 24, 2002

(65) Prior Publication Data

US 2003/0025312 A1 Feb. 6, 2003

(30) Foreign Application Priority Data

Jul. 25, 2001 (JP) ........................................ 2001-224749

(51) Int. Cl.⁷ .............................................. B60R 21/30
(52) U.S. Cl. ...................................................... 280/739
(58) Field of Search ................. 280/739, 741, 280/728.2

(56) References Cited

U.S. PATENT DOCUMENTS

| | | | |
|---|---|---|---|
| 5,257,818 A | 11/1993 | Steffens, Jr. | |
| 5,437,473 A | 8/1995 | Henseler | |
| 5,683,102 A * | 11/1997 | Davis et al. | 280/732 |
| 5,707,078 A * | 1/1998 | Swanberg et al. | 280/735 |
| 5,709,405 A * | 1/1998 | Saderholm et al. | 280/736 |
| 5,718,447 A * | 2/1998 | Rose et al. | 280/728.2 |
| 5,743,558 A | 4/1998 | Seymour | |
| 5,829,783 A | 11/1998 | Ishikawa et al. | |
| 6,039,346 A * | 3/2000 | Ryan et al. | 280/736 |
| 6,047,986 A | 4/2000 | Ishikawa et al. | |
| 6,145,878 A * | 11/2000 | Weikl | 280/739 |
| 6,158,770 A | 12/2000 | Ryan et al. | |
| 6,199,895 B1 | 3/2001 | Seymour | |
| 6,435,549 B1 * | 8/2002 | Ochiai | 280/735 |
| 6,439,603 B2 * | 8/2002 | Damman et al. | 280/736 |

FOREIGN PATENT DOCUMENTS

| | | |
|---|---|---|
| EP | 1 112 902 A2 A3 | 7/2001 |
| GB | 2 315 467 | 2/1998 |
| JP | 02-115747 | 4/1990 |
| JP | 06-127329 | 5/1994 |
| JP | 06-171453 | 6/1994 |
| JP | 10-029487 | 2/1998 |
| JP | 10-035405 | 2/1998 |
| JP | 10-076896 | 3/1998 |
| JP | 11-268605 | 10/1999 |
| JP | 11-334519 | 12/1999 |
| JP | 11-334520 | 12/1999 |
| JP | 11-334521 | 12/1999 |
| JP | 11-334522 | 12/1999 |
| JP | 11 334522 A1 | 12/1999 |
| JP | 11-334523 | 12/1999 |
| JP | 11-334525 | 12/1999 |
| JP | 2000-255372 | 9/2000 |
| JP | 2000-280855 | 10/2000 |

\* cited by examiner

*Primary Examiner*—Thomas Price
(74) *Attorney, Agent, or Firm*—Foley & Lardner (57) ABSTRACT

An airbag apparatus configured so that an amount of gas introduced into an airbag is varied by shifting the position of a closing member to open vent openings. The apparatus includes a mechanism for preventing gas generated by a gas generator from leaking through the vent openings when the closing member is closed. A base of the airbag is clamped between a heat shield plate and a retainer. The retainer includes vent openings and the base of the airbag covers the vent openings. The heat shield plate has openings corresponding to the vent openings for allowing gas to flow out of the retainer. The closing member has a plurality of openings, for allowing the gas to flow out, at the same disposing interval as that of the vent openings. When the airbag is not inflated, the openings are positioned so as to be out of line with the vent openings.

10 Claims, 12 Drawing Sheets

AIRBAG APPARATUS

BACKGROUND

The present invention relates to airbag apparatuses suitably installed in high speed vehicles such as automobiles, and particularly, it relates to airbag apparatuses in which an airbag is inflated with gas generated by a gas generator. More specifically, it relates to an airbag apparatus in which an amount of the gas introduced into the airbag from the gas generator is adjustable.

In some airbag apparatuses for protecting a passenger in a vehicle by inflating an airbag with gas generated by a gas generator, an amount of the gas introduced into the airbag is adjusted in accordance with a level of crash severity.

A dual-stage inflator is an example of such airbag apparatuses. The dual-stage inflator is provided with two combustion chambers, each filled with a gas generating agent, in its main body and is configured such that an amount of the gas introduced into an airbag is adjusted by separately igniting the gas generating agents in these two combustion chambers at different times.

In the airbag apparatus having the above-described dual-stage inflator, the inflator itself has a complicated structure, resulting in problems such as a high cost and an increased weight.

Another type of such airbag apparatuses is disclosed in U.S. Pat. No. 6,158,770 (incorporated by reference herein), comprising at least one gas vent opening disposed on a casing, a closing member covering the gas vent opening, and a shifter for opening the vent opening by shifting the closing member.

In the airbag apparatus disclosed in the foregoing U.S. Pat. No. 6,158,770, even when the vent opening is closed by the closing member, the gas generated by the gas generator is liable to leak through the vent opening.

SUMMARY OF THE INVENTION

Accordingly, an object of the present invention is to provide an airbag apparatus, in which an amount of the gas introduced into the airbag can be varied by shifting a closing member so as to open a vent opening. Another object is to minimize the amount of gas from leaking through the vent opening when the gas generator is activated while the closing member is in a closed state.

According to an embodiment of the present invention, an airbag apparatus includes a folded airbag; a casing to which the folded airbag is connected; a gas generator for generating gas for inflating the folded airbag; a plurality of vent openings disposed on the casing for discharging a part of the gas generated by the gas generator out of the casing; at least one closing member covering the vent openings; and at least one shifter for opening the vent openings by shifting the closing member. The closing member and the casing have a meltable layer interposed therebetween, the meltable layer being meltable by the gas generated by the gas generator, and the vent openings are covered by the meltable layer.

According to the embodiment described above, the closing member and the casing have the meltable layer disposed therebetween so as to cover the vent openings. The meltable layer serves as a gasket, thereby preventing the gas from leaking through the vent openings when the gas generator is activated while the closing member is in a closed state.

Preferably, the meltable layer serves as a part of the airbag, thereby eliminating any requirement for additional material for the meltable layer, thus, leading to a reduced production cost of the airbag apparatus.

According to the present invention, the closing member is preferably disposed in the casing. As a result, a pressure of the gas from the gas generator works to press the closing member against the casing, resulting in a simple mechanism for holding the closing member.

According to the present invention, the airbag apparatus is preferably configured such that the shifter is disposed outside the casing and the closing member has an outwardly extending portion which extends therefrom and which is connected to the shifter. This arrangement leads to a simple inside configuration of the casing, and also allows the shifter to be configured by selecting from a variety of mechanisms.

According to the present invention, a plurality of gas discharge ports of the gas generator are preferably disposed to face the corresponding vent openings so that the gas from the gas generator flows toward the vent openings.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

An embodiment of the present invention will be described with reference to the drawings.

Figure 1:
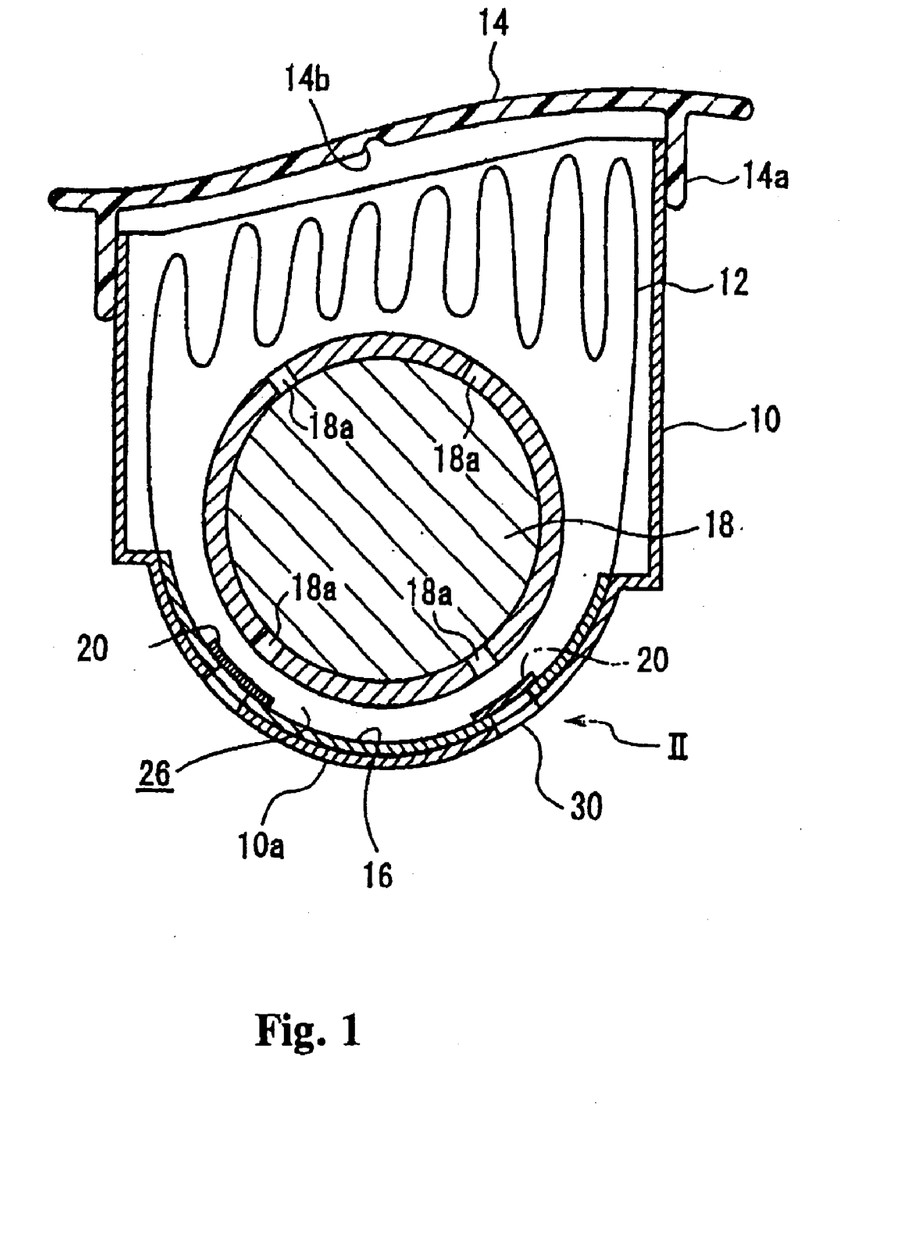
FIG. 1 is a cross sectional view of an airbag apparatus according to an of the present invention.
Figure 2A:
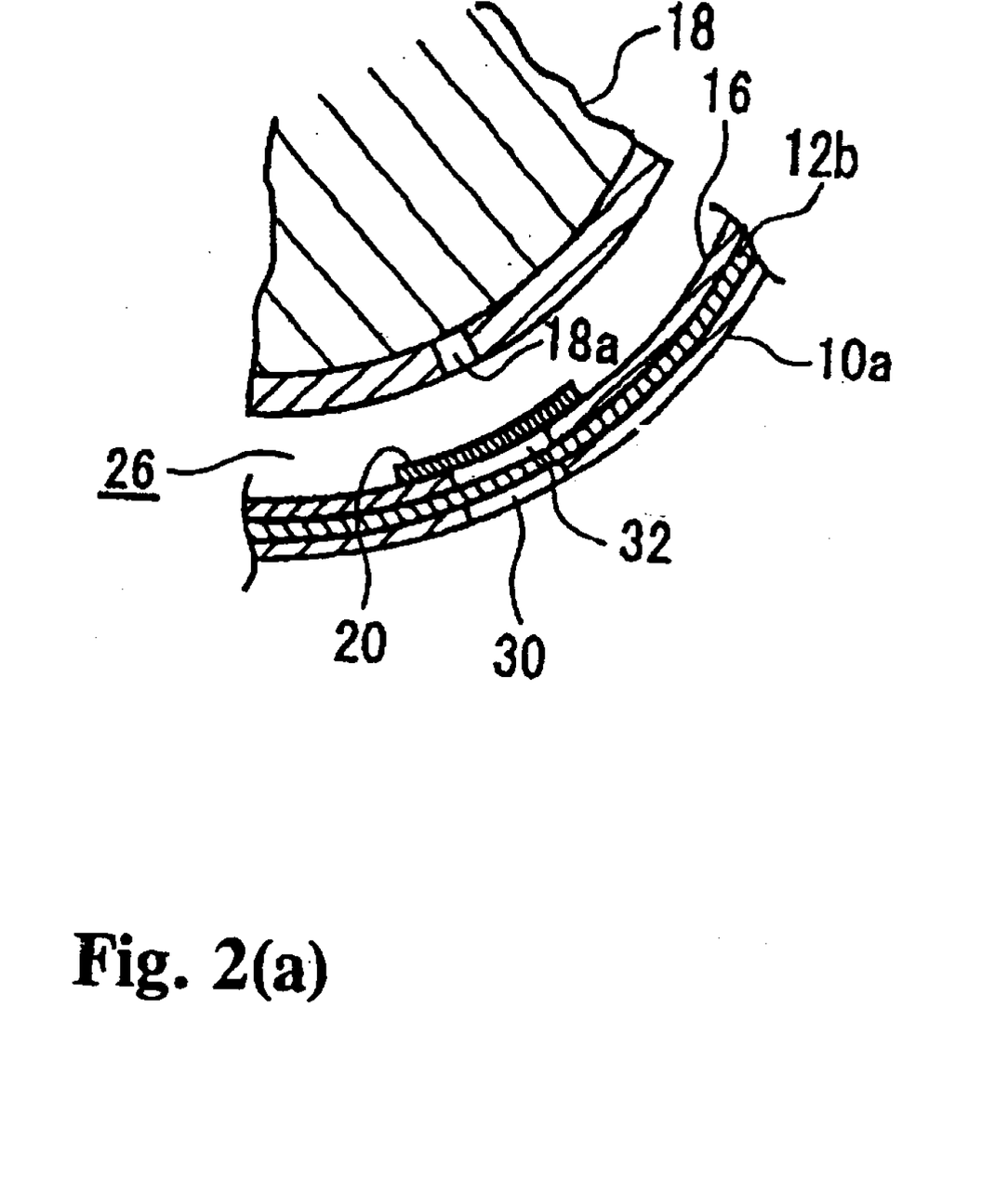
FIG. 2(a) is an enlarged illustration of the part 11 indicated in FIG. 1.
Figure 2B:
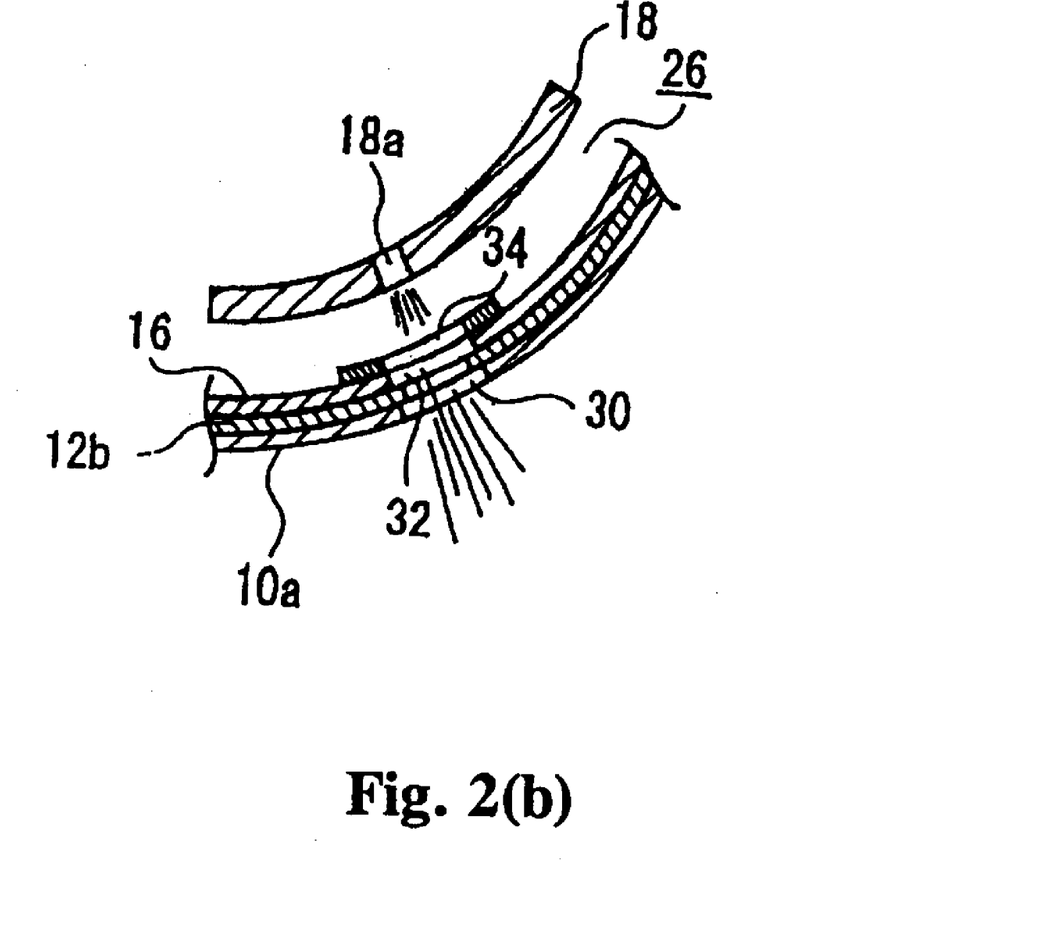
FIG. 2(b) is a sectional view of the same part as shown in FIG. 2(a) illustrating a state in which gas is discharged from a vent opening.
Figure 3:
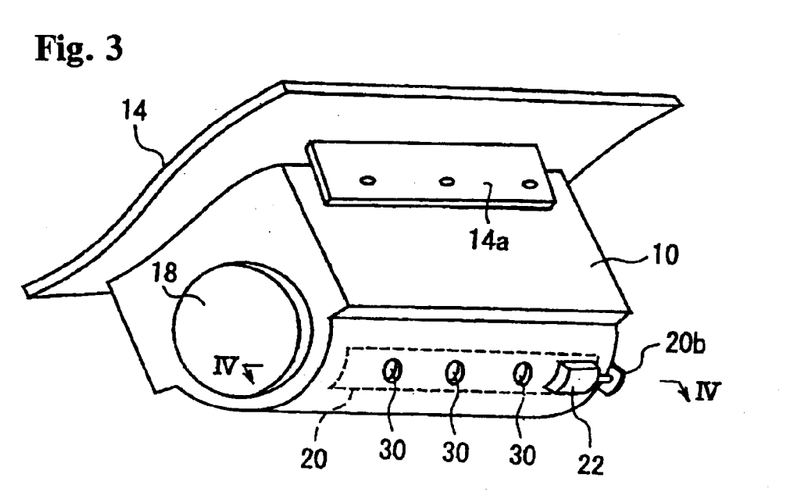
FIG. 3 is a perspective rear view of the airbag apparatus shown in FIG. 1.
Figure 4A:
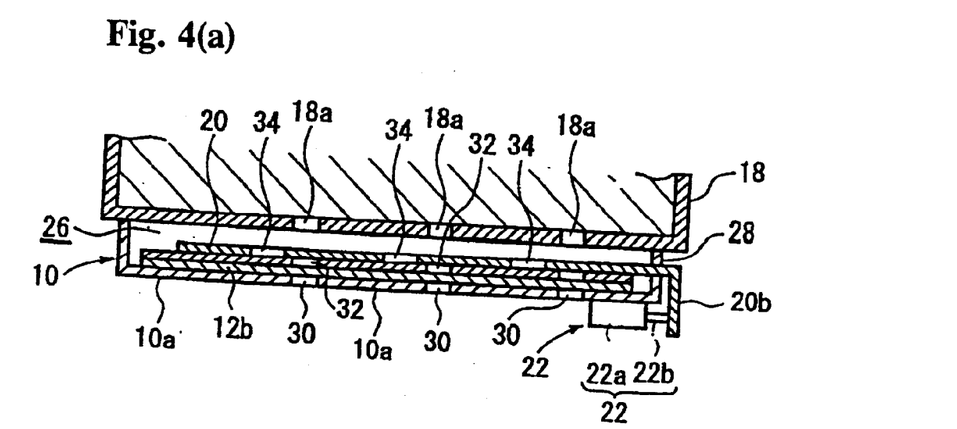
FIG. 4(a) is a partial longitudinal sectional view taken along the line IV—IV indicated in FIG. 3.
Figure 4B:
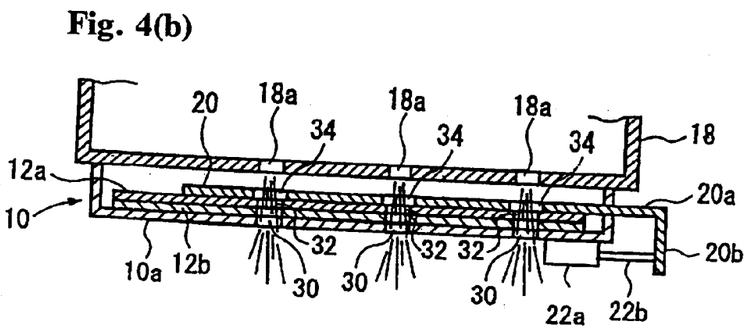
FIG. 4(b) is a partial longitudinal sectional view of the same part shown in FIG. 4(a) illustrating a state in which the gas is discharged from the vent opening.
Figure 5:
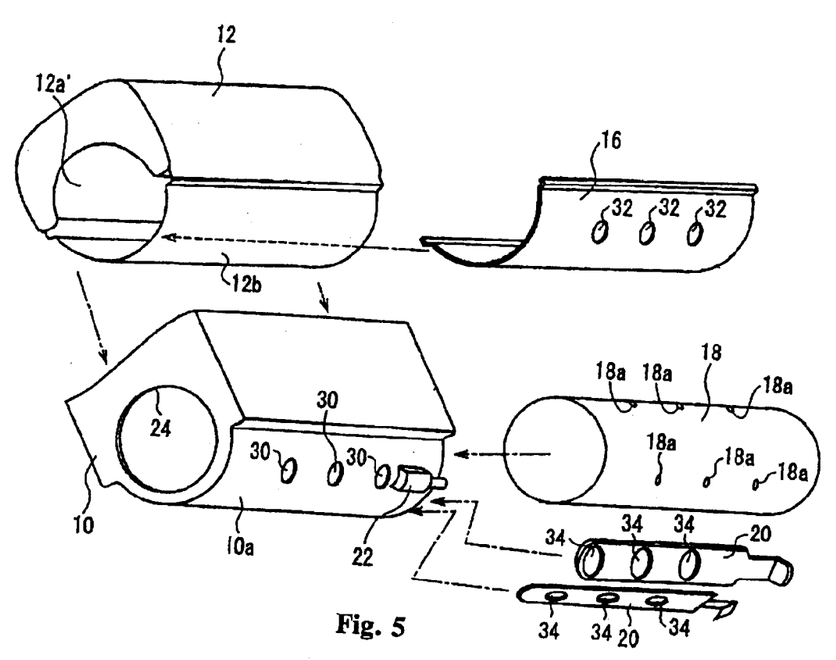
FIG. 5 is an exploded perspective view of the airbag apparatus shown in FIG. 1.

FIGS. 1–6 disclose an embodiment of the present invention. As shown in FIG. 1, passenger-side airbag apparatus according to the embodiment includes a retainer 10 serving as a casing, an airbag 12 folded and disposed in the retainer 10, and a lid 14 covering an opening at the front side of the retainer 10. The lid 14 is fixed to the retainer 10 with legs 14a thereof and has a tear line 14b thereon. The apparatus also includes a heat shield plate 16 disposed in the airbag 12, a cylindrical inflator 18 serving as a gas generator for generating gas for inflating the airbag 12, and closing members 20. As shown in FIGS. 3–4, shifters 22 are provided for moving the corresponding closing members 20.

The retainer 10 is open at the upper side thereof as shown in FIG. 1 and has a bulge 10a at the bottom side thereof which expands outwardly into a semi-cylindrical shape. The semi-cylinder of the bulge 10a has a shape extending along the outer surface of the inflator 18.

Figure 6:
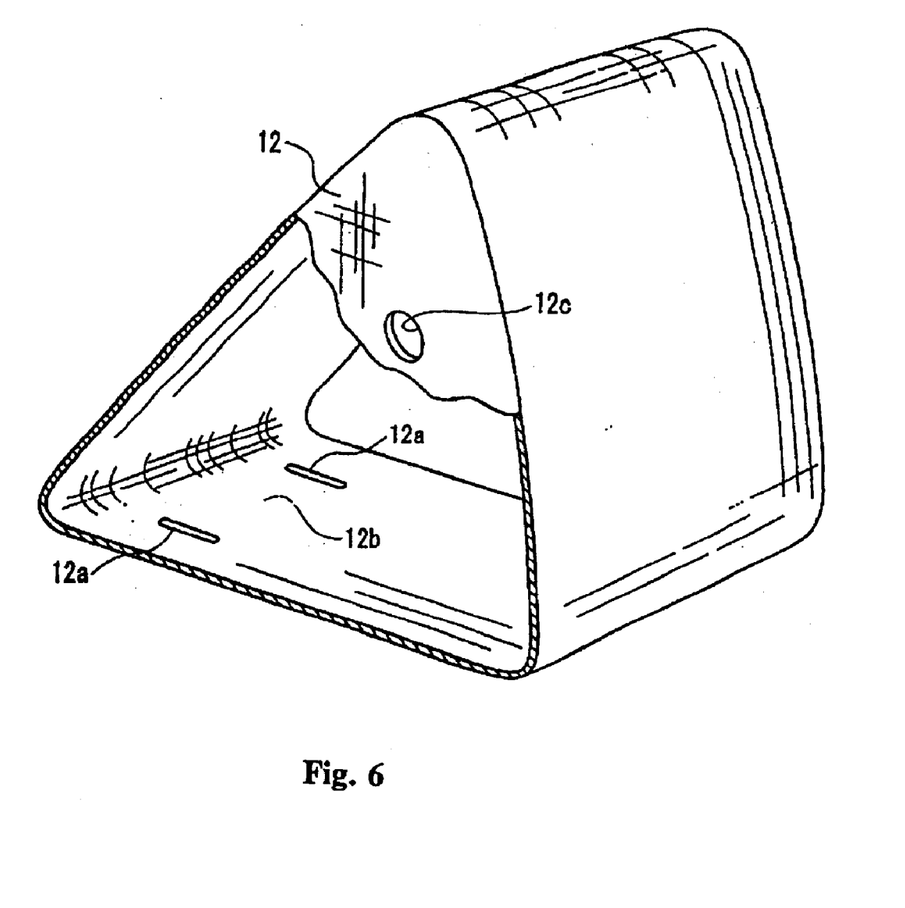
FIG. 6 is a perspective sectional view of an airbag of the airbag apparatus shown in FIG. 1.

As shown in FIG. 6, the airbag 12 comprises a pair of slits 12a and an airbag base 12b between the silts 12a protruding downwardly in a semi-cylindrical shape. With this configuration, the slits 12a form a pair of through-holes 12a' of the inflator 18 (see FIG. 5). A reference mark 12c denotes a vent hole of the airbag 12.

The heat shield plate 16 is inserted into the airbag 12 through the through-hole 12a', superposed on the base 12b of the airbag 12, wherein the base 12b is inflated out in a semi-cylindrical shape, and fixed to the bottom 10a of the retainer 10 by fixtures such as rivets (not shown). Thus, the base 12b of the airbag 12 is clamped between the heat shielding plate 16 and the retainer bottom 10a and the airbag 12 is coupled with the retainer 10.

The retainer 10 has circular openings 24 on both side surfaces thereof, and the inflator 18 is inserted into the retainer 10 through one of the openings 24. The inflator 18 is inserted into the airbag 12 through one of the inflator through-holes 12a' of the airbag 12 and is further inserted into the other opening 24 of the retainer 10 through the other inflator through-hole 12a'. The outer surface of the inflator 18 and the heat shield plate 16 forms a gap (a gas flow channel) 26 therebetween.

The retainer 10 has slits 28 (see FIG. 4(a)), for allowing the closing members to pass through, disposed at one side surface thereof and also between the corresponding opening 24 and the retainer bottom 10a. The closing members 20 are inserted into the retainer 10 through the slits 28 and superposed on the heat shield plate 16. Each of the closing members 20 has an outwardly extending portion 20a extending out from one end thereof in the longitudinal direction thereof. The outwardly extending portion 20a extends out of the retainer 10 through the slit 28 and has an L-shape projecting piece 20b at the front end thereof.

The retainer bottom 10a has a plurality of gas vent openings 30 formed thereon so as to face the closing members 20. The vent openings 30 are disposed at a predetermined interval in the longitudinal direction of the closing member 20. The base 12b of the airbag 12 covers the vent openings 30.

The heat shield plate 16 has a plurality of openings 32, formed thereon for allowing gas to flow out, which are in line with the corresponding vent openings 30.

The closing member 20 has a plurality of openings 34 formed thereon at the same interval as that of the vent openings 30 in the longitudinal direction thereof for allowing the gas to flow out. In a normal state (that is, when the airbag is not being inflated), the openings 34 are positioned so as to be out of line with the corresponding vent openings 30.

The shifters 22 are attached on the outer surface of the bottom 10a of the retainer 10. As shown in FIGS. 4(a) and 4(b), each of the shifters 22 comprises a cylinder 22a and a rod 22b protruding from the cylinder 22a. The front end of the rod 22b in the protruding direction thereof is firmly attached to the projecting piece 20b of the closing member 20. The cylinder 22a is filled with a piston and gunpowder. When the gunpowder is ignited with an igniter (not shown), the piston is pressed, thereby causing the rod 22b to extend. However, the present invention is not limited to such a gunpowder-actuator mechanism, but other linear actuator mechanisms such as a solenoid mechanism may also be employed.

According to this embodiment, the inflator 18 has two rows of gas discharge ports 18a which are disposed on the bottom side thereof and which face the bottom 10a of the retainer 10. The vent openings 30 are positioned in radial directions with respect to the corresponding gas discharge ports 18a and are also disposed on the bottom 10a in two rows. The ports 18a and vent openings 30 are disposed to face each other. In accordance with this arrangement, two closing members 20 and two shifters 22 are disposed.

The inflator 18 has additional two rows of gas discharge ports 18a disposed on the upper side thereof. Here, the "row" in the present invention extends in the longitudinal direction of the cylindrical inflator 18, i.e., in a direction parallel to the axis line of the inflator 18.

When a vehicle provided with an airbag apparatus having such a configuration crashes at a speed greater than or equal to a prescribed value, the inflator 18 is activated and gas flows through all the gas discharge ports 18a. A pressure of the gas causes the airbag 12 to start inflation, the lid 14 to tear along the tear line 14b, and the airbag 12 to inflate on a large scale in a compartment of the vehicle.

When a level of crash severity is high, or a body frame of a passenger is large, the shifters 22 are not activated. Thus, the total amount of gas which flows through all the discharge ports 18a is introduced into the airbag 12, causing the airbag 12 to inflate quickly and to have a high inner pressure. In this case, the vent openings 30 are closed by the closing members 20, and also are covered by the base 12b of the airbag 12, allowing the base 12b to act as a gasket, thereby preventing gas leakage from the vent openings 30 to a substantially perfect degree. The gas which flows from the gas discharge ports 18a on the bottom side of the inflator 18 is introduced into the airbag 12 through the gas flow channel 26.

When a level of crash severity is low, or a body frame of a passenger is small, the shifters 22 are activated so as to extend the rod 22b. Then, the closing members 20 move as shown in FIG. 4(b) so that the openings 34 are in line with the corresponding openings 32 and the corresponding vent openings 30. With this arrangement, the gas which flows from the gas discharge ports 18a passes through the corresponding openings 34 and 32 and strikes the airbag base 12b. A temperature and a pressure of the flowing gas cause the airbag base 12b to melt, allowing the gas which flows from the discharge ports 18a on the bottom side of the inflator 18 to be discharged through the vent openings 30. As a result, an amount of gas introduced into the airbag 12 decreases, allowing the airbag 12 to inflate relatively slowly and to have a relatively low inner pressure.

Since the embodiment of the invention includes two closing members 20 and the two shifters 22, one of the shifters 22 may be activated at a high level of crash severity, and both shifters 22 may be activated at a low level of crash severity. Also, the single shifter 22 may be used for the two closing members 20 by activating the two closing members 20 at the same time. The scope of the present invention includes the use of a single closing member 20 and a single shifter 22.

In any case, by properly adjusting the timing for activating the shifter 22 according to a level of crash severity, an amount of gas to be introduced into the airbag 12 can be varied in a substantially continuous manner. When the shifter 22 is not activated, the total amount of gas from the inflator 18 is introduced into the airbag 12. The smaller the time difference between a time for igniting the inflator 18 and another time for activating the shifter 22, the smaller amount of gas is introduced into the airbag 12.

Figure 7A:
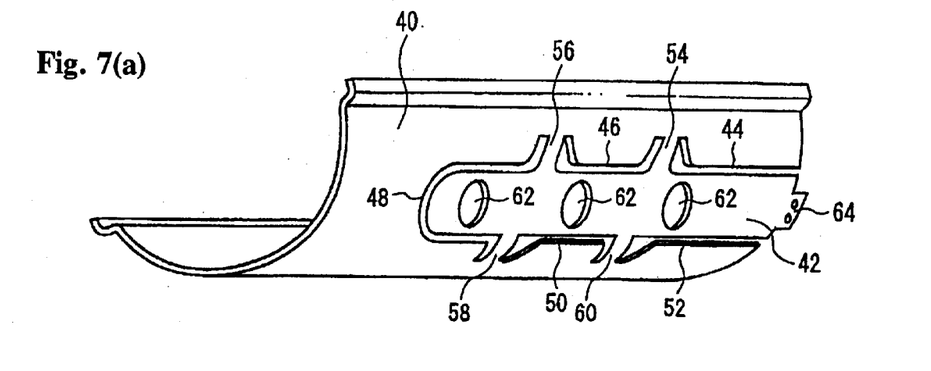
FIGS. 7(a) and 7(b) are perspective views illustrating configurations of a heat shield plate and a closing member, respectively, of an airbag apparatus according to another embodiment of the present invention.
Figure 7B:
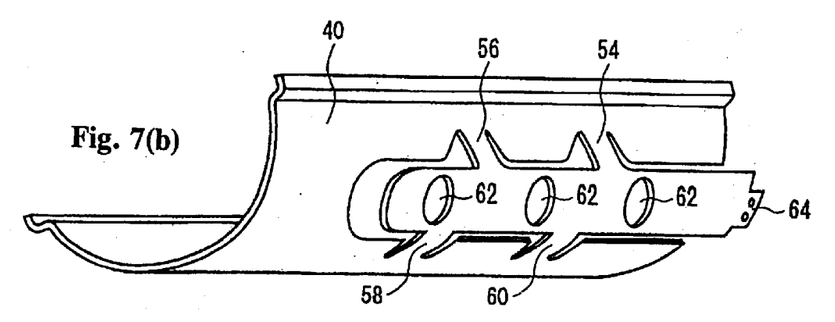

FIGS. 7(a) and 7(b) are perspective views of a heat shield plate 40 of an airbag apparatus according to another embodiment of the present invention. The heat shield plate 40 is metallic and formed integrally with a closing member 42. More particularly, the heat shield plate 40 has slits 44, 46, 48, 50, and 52 disposed thereon so as to form an approximate U-shape. The closing member 42 lies in the region inside these slits 44 to 52 and is in communication with the heat shield plate 40 via bridges 54, 56, 58, and 60.

The bridges 54 to 60 have a narrow width and are deformable in the longitudinal direction of the closing member 42 (in a direction parallel to the axis line of the semi-cylindrical heat shield plate 40). The closing member 42 has a plurality of openings 62 in the longitudinal direction thereof spaced away from each other. The openings 62 have the same function as that of the openings 34 of the closing member 20.

The heat shield plate 40 has a projection 64 disposed at the end thereof in the longitudinal direction. The projection 64 is connected to the shifter via a connecting member (not shown). When the closing member 42 is pulled by the shifter in the rightward direction in FIG. 7(a), the closing member 42 moves as shown in FIG. 7(b), thus the openings 62 are in line with the corresponding openings 32 and the corresponding vent openings 30, and the inflator discharging gas is discharged.

The number of the closing members 42 of the heat shield plate 40 shown in FIGS. 7(a) and 7(b) may be one or more.

Figure 8A:
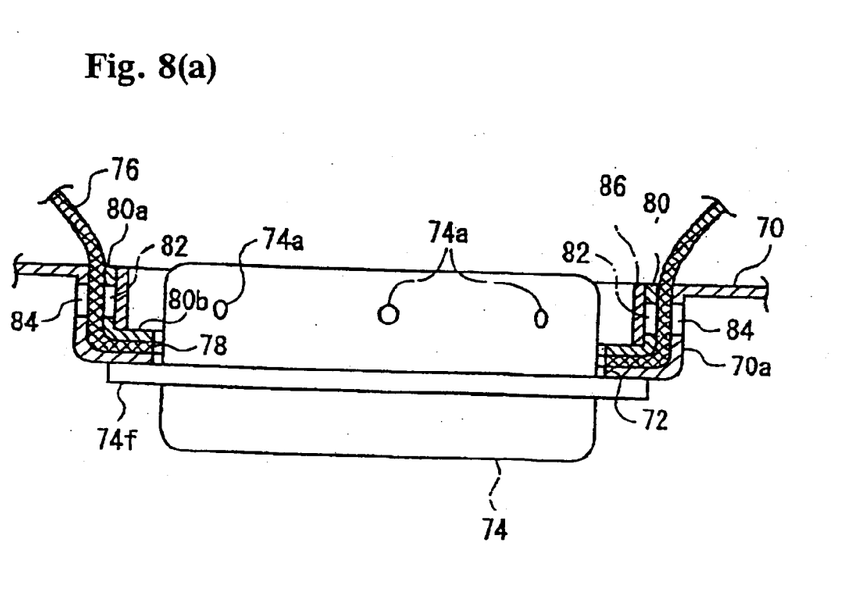
FIGS. 8(a) and 8(b) are a longitudinal sectional view illustrating a configuration of an airbag apparatus and a perspective view of a major part of the same, respectively, according to still another embodiment of the present invention.
Figure 8B:
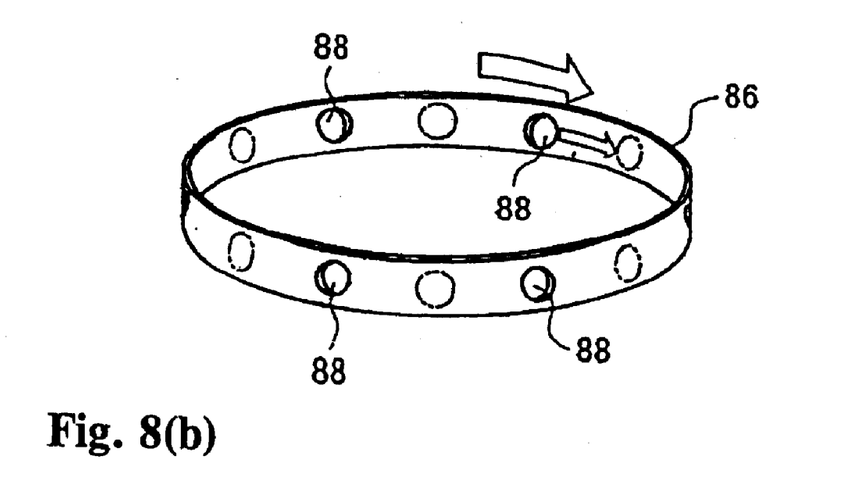

Although the above-described embodiments are concerned about passenger-side airbag apparatuses, the present invention is also applicable to a driver-side airbag apparatus as shown in FIGS. 8(a) and 8(b). In the driver-side airbag apparatus shown in FIG. 8(a), a round recess 70a is formed at the central part of a retainer 70 serving as a casing, and a top portion of an inflator 74 is inserted into an opening (an inflator mounting opening) 72 disposed at the central part of the recess 70a.

An airbag 76 is formed by superposing two pieces of round cloth for front and rear panels and by bonding the peripheries thereof with a thread or an adhesive. The rear panel has a receiving opening 78 for receiving the top portion of the inflator 74. The receiving opening 78 is disposed at the periphery of the mounting opening 72. The periphery of the receiving opening 78 is clamped between a pressure ring (a holding plate) 80 and the periphery of the mounting opening 72.

The pressure ring 80 has a stud bolt (not shown) firmly attached thereto. By inserting the stud bolt into a bolt through-hole of the airbag 76, into another bolt through-hole of the retainer 70, and into yet another bolt through-hole disposed on a flange 74f of the inflator 74, and by screwing a nut (not shown), the airbag 76 and the inflator 74 are fixed to the retainer 70.

The airbag 76 is in an expandably folded state and is covered by a module cover (not shown). The module cover is torn by an expanding pressure of the airbag 76 when the airbag 76 expands with the gas discharged from the inflator 74.

The pressure ring 80 having an L-shape cross section comprises an erect wall 80a facing the outer surface of the inflator 74 and a bottom seat 80b for pressing the airbag 76 against the bottom surface of the recess 70a.

The erect wall 80a has a plurality of openings 82 disposed thereon at a predetermined interval in the circumferential direction thereof for allowing the gas to flow out. The recess 70a has a plurality of gas vent openings 84 disposed on the falling wall thereof so as to be in line with the corresponding openings 82. The vent openings 84 are covered by the periphery of the inflator receiving opening 78 of the airbag 76.

The pressure ring 80 has a closing member 86 disposed along the inner surface of the erect wall 80a. The closing member 86 has a ring shape and has a plurality of openings 88 formed thereon at a predetermined interval in the circumferential direction thereof. This interval agrees with that of the openings 82.

The closing member 86 is rotatable by a predetermined angle in a direction indicated by an arrow in FIG. 8(b) with a circumferential shifter (i.e., a rotor) (not shown).

The inflator 74 has a plurality of discharge ports 74a on the circumferential surface, which faces the falling wall of the recess 70a, of the top portion thereof spaced away from each other in the circumferential direction thereof. The vent openings 84 are disposed in the radial direction of the corresponding gas discharge ports 74a so as to face each other.

When a vehicle provided with an airbag apparatus having such a configuration crashes at a speed greater than or equal to a prescribed value, the inflator 74 is activated and the gas flows through all the gas discharge ports 74a. A pressure of the gas causes the airbag 76 to start inflation, the module cover to tear, and the airbag 76 to inflate on a large scale in a compartment of the vehicle.

When a level of crash severity is high, the foregoing shifter (rotor) is not activated. Thus, the total amount of gas which flows through all the discharge ports 74a is introduced into the airbag 76, causing the airbag 76 to inflate quickly and to have a high inner pressure. In this case, the vent openings 84 are closed by the closing member 86 and also are covered by the periphery of the inflator receiving opening 78 of the airbag 76, thereby preventing gas leakage from the vent openings 84 to a substantially perfect degree. The gas which flows from the gas discharge ports 74a on the circumferential surface of the inflator 74 is introduced into the airbag 76 along inner wall of the recess 70a.

When the airbag 76 requires a small amount of inflation gas in the cases such as a low level of crash severity, the foregoing shifter (rotor) is activated. Then, the closing member 86 moves in the circumferential direction thereof so that the openings 88 are in line with the corresponding openings 82 of the pressure ring 80 and the corresponding vent openings 84. With this arrangement, the gas which flows from the gas discharge ports 74a passes through the corresponding openings 88 and 82 and strikes the periphery of the inflator receiving opening 78 of the airbag 76. A temperature and a pressure of the flowing gas cause the periphery of the inflator receiving opening 78 of the airbag 76 to melt, allowing the gas which flow from the discharge ports 74a on the circumferential surface of the inflator 74 to be discharged through the vent openings 84. As a result, an amount of the gas introduced into the airbag 76 decreases, allowing the airbag 76 to inflate relatively slowly and to have a relatively low inner pressure.

Although the closing member 86 and the pressure ring 80 are shown as separate components in FIGS. 8(a) and 8(b), the closing member and the pressure ring may be formed integrally in the same fashion in which the heat shield plate 40 and the closing member 42 are formed integrally in the embodiment shown in FIGS. 7(a) and 7(b). More particularly, although not shown, the closing member and the pressure ring may have a configuration in which, for example, a pair of annular slits extending in parallel to each other is formed on the erect wall of the pressure ring in the circumferential direction of the pressure ring, so that the region of the pressure ring sandwiched between the slits is formed to be the closing member which has a plurality of openings (serving as the same function as that of the openings 88 of the closing member 86), spaced away from each other in the circumferential direction of the erect wall, for allowing the gas to flow out, and which is connected to the erect wall in the circumferential direction of the pressure ring via deformable bridges.

This configuration allows the airbag apparatus to have a reduced number of components, leading to an easy assembly and a reduced weight of the airbag apparatus.

The above-described embodiments are related to exemplary applications of the present invention to a passenger-side airbag apparatus and a driver-side airbag apparatus, both installed in a vehicle. The present invention is also applicable to a variety of airbag apparatuses such a rear-seat airbag apparatus, airbag apparatuses for protecting a passenger's head and for protecting passenger's legs in a vehicle, and also an airbag apparatus for protecting a passenger in other high speed vehicles such as a train and an airplane. In addition, the airbag apparatus according to the present invention may also be suitably installed in a building and the like.

As described above, in the airbag apparatus according to the present invention, since the closing member and the casing have a layer adapted to melt disposed therebetween for covering the vent openings. The layer melts with a temperature and a pressure of the gas generated by the gas generator and serves as a gasket, thereby preventing the gas leakage from the vent openings to a substantially perfect degree when the gas generator is activated while the closing member is in a closed state.

According the present invention, the melting layer is formed as a part of the airbag, thereby eliminating the need for additional material, and leading to a reduced production cost of the airbag apparatus.

Also, according to the present invention, the closing member is disposed in the casing, thereby reducing the bulk of the airbag apparatus. Furthermore, the pressure of the gas from the gas generator works to press the closing member against the casing, resulting in a simple mechanism for holding the closing member.

Still further, according to the present invention, the airbag apparatus is configured such that the shifter is disposed outside the casing and the outwardly extending portion extending from the closing member is connected to the shifter, leading to a simpler inside structure of the casing, and allowing the shifter to be configured by selecting from a variety of mechanisms, thereby increasing the freedom to use a number of different layout configurations for the apparatus.

According to the present invention, the gas discharge ports of the gas generator and the corresponding vent openings of the casing are disposed so as to face each other, allowing the layer to melt in a short time while the gas is being discharged.

The priority application, Japanese Patent Application No. 2001-224749, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag apparatus comprising:

a folded airbag;

a casing to which the folded airbag is connected;

a gas generator for generating gas for inflating the airbag;

a plurality of vent openings disposed on the casing for discharging a portion of the gas generated by the gas generator out of the casing;

at least one closing member covering the vent openings; and at least one shifter for opening the vent openings by shifting the position of the closing member, wherein the closing member and the casing have a layer interposed therebetween so that the vent openings are covered by the layer; and wherein the layer is adapted to be melted by the gas generated by the gas generator.

2. The airbag apparatus according to claim 1, wherein the layer comprises part of the airbag.

3. The airbag apparatus according to claim 1, wherein the closing member is disposed in the casing.

4. The airbag apparatus according to claim 3, wherein the shifter is disposed outside the casing and the closing member has an outwardly extending portion which extends therefrom and which is connected to the shifter.

5. The airbag apparatus according to any one of claim 1, wherein the gas generator includes a plurality of gas discharge ports disposed to face the corresponding vent openings.

6. An airbag apparatus comprising:

a gas generator;

a retainer connected to an airbag and including a plurality of vent openings for discharging a portion of gas generated by the gas generator;

a closing member covering the vent openings; and wherein the airbag includes a sealing portion located between the retainer and the closing member, the sealing portion covering the vent openings and acting as a gasket between the retainer and the closing member.

7. The airbag apparatus of claim 6, wherein the closing member is movable between a first and second position.

8. The airbag apparatus of claim 7, wherein the second position of the closing member uncovers the vent openings so that the gas generated by the gas generator melts the sealing portion of the airbag and escapes from the retainer.

9. An airbag apparatus comprising:

an airbag connected to a retainer including a plurality of vent openings;

an inflator for providing gas for inflating the airbag;

a closing member configured to move between a first position in which the vent openings are closed and a second position in which the vent openings are open thereby allowing a portion of gas generated by the inflator to be discharged through the vent openings; and wherein the airbag includes a sealing portion located between the retainer and the closing member thereby reducing leakage through closed vent openings.

10. The airbag apparatus of claim 9, wherein the sealing portion is configured to melt when exposed to gas generated by the inflator so that when the closing member is in the second position the portion of the gas can be discharged.

* * * * *